Figure 1:
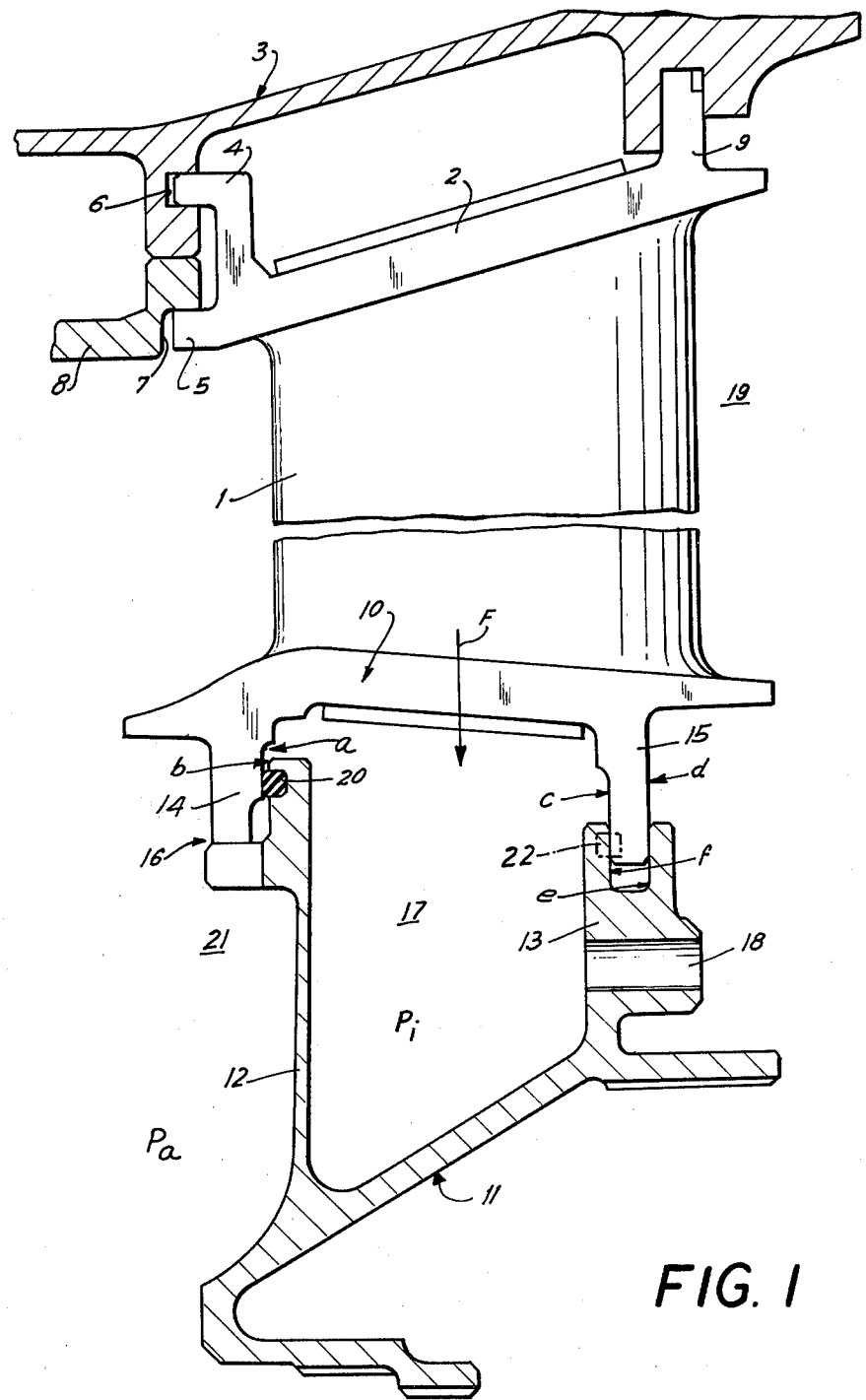

United States Patent [19]

Schweikl et al.

[11] 4,384,822
[45] May 24, 1983

[54] TURBINE NOZZLE VANE SUSPENSION FOR GAS TURBINE ENGINES

[75] Inventors: Ludwig Schweikl, Mossburg; Horst Weiss, Seefeld; Friedrich Sippel, Stein, all of Fed. Rep. of Germany

[73] Assignee: Motoren- und Turbinen-Union Munchen GmbH, Munich, Fed. Rep. of Germany

[21] Appl. No.: 228,822

[22] Filed: Jan. 26, 1981

[30] Foreign Application Priority Data

Jan. 31, 1980 [DE] Fed. Rep. of Germany ....... 3003470

[51] Int. Cl.³ .......................... F01D 5/18; F01D 25/26
[52] U.S. Cl. .................................... 415/137; 415/115; 415/138; 415/200
[58] Field of Search .............................. 415/135–139, 415/115, 189, 200, 217, 218

[56] References Cited

U.S. PATENT DOCUMENTS

| | | | |
|---|---|---|---|
| 2,625,367 | 1/1953 | Rainbow et al. | 415/217 X |
| 3,018,085 | 1/1962 | Welsh | 415/136 |
| 3,043,564 | 7/1962 | Small, Jr. | 415/137 |
| 3,990,807 | 11/1976 | Sifford | 415/115 X |
| 4,149,823 | 4/1979 | Zboril | 415/200 X |
| 4,176,433 | 12/1979 | Lee et al. | 415/200 X |
| 4,194,869 | 3/1980 | Corcokios | 415/189 X |

FOREIGN PATENT DOCUMENTS

| | | | |
|---|---|---|---|
| 151389 | 5/1953 | Australia | 415/138 |
| 593841 | 3/1960 | Canada | 415/139 |
| 620603 | 5/1961 | Canada | 415/137 |

*Primary Examiner*—Philip R. Coe
*Attorney, Agent, or Firm*—Alan H. Levine

[57] ABSTRACT

A turbine nozzle vane suspension arrangement of the type wherein the nozzle vanes are suspended by their outer shroud segments from the outer turbine casing and are suspended by their vane ring segments from an annular vane carrier. The vane carrier has axially spaced apart and radially-extending wall sections cooperating with root-ends projecting radially from the vane ring segments. The vane ring segments and their root-ends, and the vane carrier and its wall sections define between them an annular channel for receiving cooling air. The forward wall section of the vane carrier is axially resilient and bears resiliently against the forward vane root-end to provide a seal for the annular channel. The resilient forward wall section can be flexed axially rearwardly to permit the vane ring segments to be mounted on the vane carrier. Seals are provided between the cooperating wall sections and root-ends, or at least some of the contacting surfaces of the wall sections and root-ends are provided with wear-inhibiting and abraidable coatings.

13 Claims, 2 Drawing Figures

TURBINE NOZZLE VANE SUSPENSION FOR GAS TURBINE ENGINES

This invention relates to turbine nozzle vane suspensions for gas turbine engines, wherein the nozzle vanes are suspended almost rigidly by their outer shroud segments from the outer turbine casing, or are otherwise connected thereto. On the inside, i.e., the side facing the inner flow duct wall, the vanes are suspended, with limited radial and axial movement, and prevented from rotation circumferentially, on an annular vane carrier. The latter is arranged coaxially to the longitudinal centerline of the turbine and is provided with two, axially spaced-apart, radially extending wall sections cooperating with radially projecting root-end portions of the nozzle vane ring segments using tongue-in-groove or rabbet type, mutually engaging locating joints. The vane carrier, together with the adjacent root-end portions of the vane ring segments, define between them an annulus which is fed with cooling air exiting from the nozzle vanes.

In an already proposed arrangement of this type, a radially resilient piston ring is inserted in a circumferential slot of the forward, radially extending wall section of the vane carrier facing the inner wall of the flow duct. For sealing effect, the adjacent root portions of the vane ring segments bear on the outer circumferential surface of the piston ring. This poses considerable problems during assembly, due to the fact that the vane ring segments must be inserted, against the pressure of the resilient piston ring, in locating lips arranged in front of the piston ring on the forward wall section of the vane carrier. The segments must then be located using a wire sling. This assembly problem is also encountered whenever a segment is replaced.

A further notable disadvantage of the previously proposed arrangement is caused by the unsatisfactory sealing action of the piston ring. The piston ring is unable to compensate for differences in manufacturing tolerances of the various vane ring segments, so that gaps of various sizes remain between the outer circumferential surface of the piston ring and the adjacent root-end portions of the vane ring segments. These gaps allow leakage air to escape which is then lost to the vane cooling process. Reconditioning work undertaken on the pertinent sealing portions in order to alleviate this disadvantage, apart from the additional amount of work required, largely precludes the free use of the vane ring segments. Nor does the previously proposed arrangement give satisfaction with regard to compensating for dissimilar thermal loads and distortions occurring in service.

It is a broad object of the present invention to eliminate the difficulties or disadvantages associated with the previously proposed arrangement by providing a type of turbine nozzle vane suspension which makes assembly and disassembly relatively simple, but nevertheless provides optimum sealing conditions between the inner ring-shaped vane carrier and the adjacent root-end nozzle vane segment portions, bearing in mind the dissimilar thermal loads applied to these parts.

Figure 2:
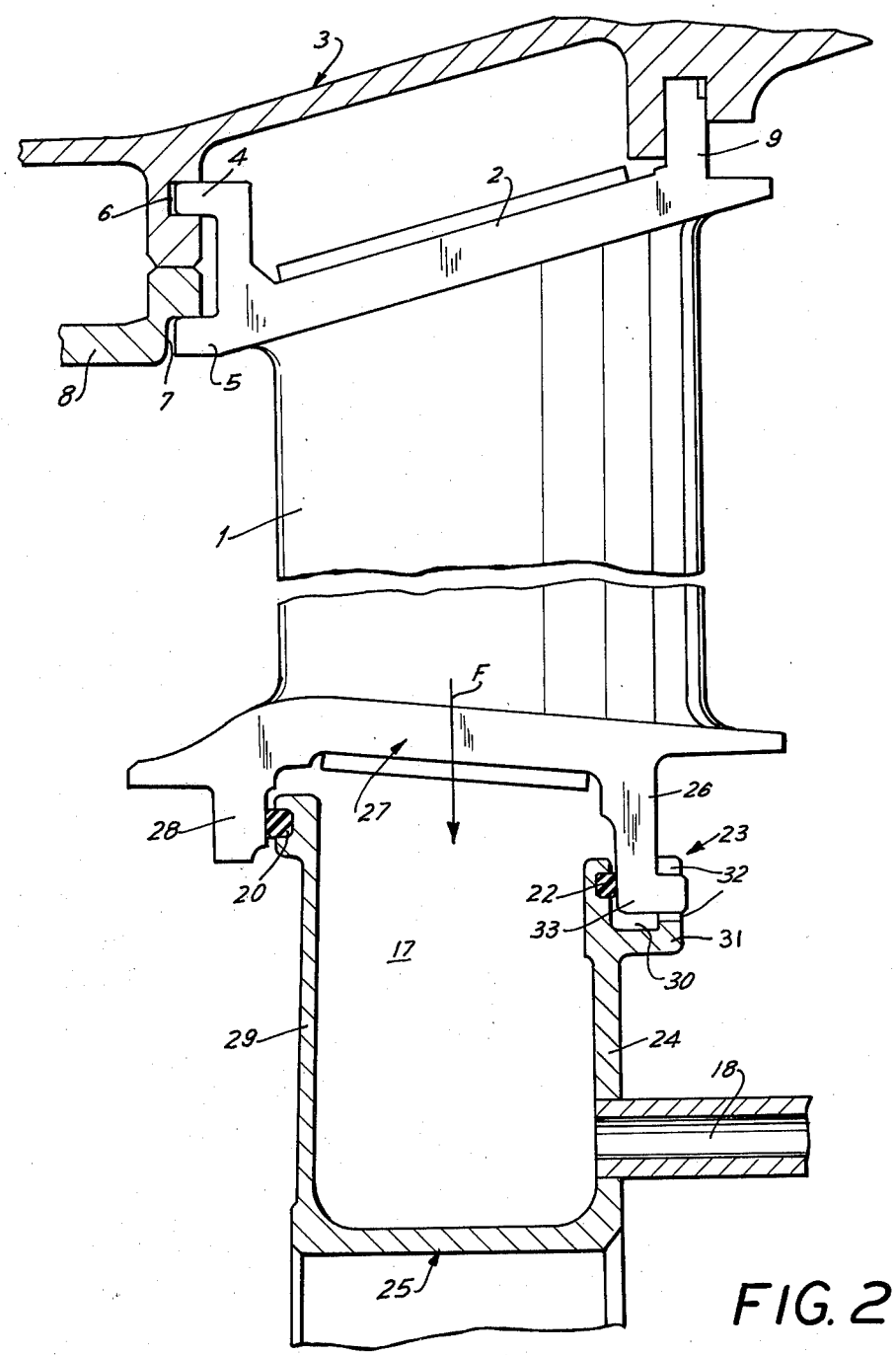

Further objects and advantages of the present invention will become apparent from the following description made in light of the accompanying drawings, in which:

FIG. 1 is an axial cross-sectional view illustrating a first embodiment of the blade suspension arrangement; and FIG. 2 illustrates the blade suspension arrangement in an alternative embodiment.

FIG. 1 illustrates a turbine nozzle vane suspension arrangement for a gas turbine engine, wherein the vanes 1 are suspended almost rigidly by their outer shroud segments 2 from the outer turbine casing 3, or otherwise joined thereto. For this purpose, the shroud segments 2 present, at their forward faces, axially projecting webs 4 and 5, the webs 4 engaging a corresponding casing slot 6. The webs 5 engage below a coaxially arranged casing shoulder 7 of a casing insert 8 forming part of the turbine casing. The shroud segments 2 are held at their rear ends by radially projecting webs 9 engaged in a coaxially extending circumferential slot in the turbine casing 3.

On the inside, i.e., the side facing the inner wall of the flow duct 19, vane ring segments 10 are suspended from a ring-shaped vane carrier 11 (air casing component) for limited radial and axial movement, and are prevented from rotation circumferentially. The vane carrier 11 is provided with two, axially spaced-apart, radially extending wall sections 12 and 13. These wall sections cooperate with radially projecting root-end portions 14 and 15 of the nozzle vane ring segments 10 using tongue-in-groove joints (between wall section 13 and root-end portions 15) and mutually engaging lip-type locating joints 16 (between wall section 12 and root-end portion 14). Apart from its centrally and circumferentially locating functions, joint 16 also provides a locally restricted, axially and radially moveable suspension.

The vane carrier 11, together with the adjacent radially projecting root-end portions 14 and 15 of the vane ring segments 10, define an annular channel 17 fed with cooling air issuing (in the direction of arrowhead F) from the nozzle vanes 1. The cooling air can optionally be diverted from the annular channel 17 through holes 18, arranged in the rear wall portion 13, and carried to the turbine duct 19 as additional turbine cooling air and at least partially also as sealing air. The flow of cooling air can conceivably also be reversed, the air first being ducted to the channel 17 from which it then flows upwardly into and through the nozzle vanes.

The forward radially extending wall section 12 of the annular vane carrier 11 takes the shape of an integral, resilient component which is axially prestressed and so bears, with a seal 20, on the mating faces of the radially projecting root-end portions 14 of the nozzle vane ring segments 10. In the interest of optimum sealing conditions, another advantage is provided by the fact that the pressure $P_i$ present in the annulus 17 is, when the turbomachine or the gas turbine engine is operating, always higher than the pressure $P_a$ present in a casing cavity 21 at the turbine end; in other words, pressure in annular channel 17 exceeds the pressure ahead of the forward resilient wall section 12 of the vane carrier 11.

In the interest of simple assembly and disassembly, a further advantage is afforded because the axially prestressed forward wall section 12 of the annular vane carrier 11 can be flexed axially backwards, using a suitable fixture, before the nozzle vane ring segments 10 and the nozzle vanes 1 are mounted on the blade carrier 11. When the forward wall section 12 springs back against the mating parts after mounting, it achieves the centrally and circumferentially locating effect indicated by numeral 16 as well as the sealing effect between the parts 12 and 14. A sealing ring extending coaxially to the turbine centerline is at least partially embedded, as seal 20, in the forward resilient wall section 12.

As indicated in broken lines in FIG. 1, a further seal 22 can readily be provided, conceivably in the shape of a sealing ring, between the rear wall section 13 of the vane carrier 11 (or between a left-hand shoulder of wall section 13) and the respective adjacent mating faces of the radially projecting root-end portions 15 of the nozzle vane ring segments 10.

Using the same reference numerals as in FIG. 1 for essentially unchanged components, FIG. 2 is characterized, among other things, by a joint 23 arranged between the rear radial wall section 24 of the vane carrier 25 (air casing component) and the adjacent radially projecting root-end portions 26 of the nozzle vane ring segments 27. Joint 23 provides centrally and circumferentially locating suspension permitting locally limited radial and axial movement. A further joint between the forward radially projecting root-end portions 28 of the nozzle vane ring segments 27 and the mating extreme end of the axially prestressed forward wall section 29 is here produced solely by the axial preload imposed by wall section 29 in the direction of the respective mating faces of portions 28. It is especially this last-mentioned further joint which provides operationally desirable, axial and radial moveability of the nozzle vane ring segments 27 relative to the vane carrier 25, or vice versa.

So that joint 23 can permit centrally and circumferentially locating suspension with locally restricted radial and axial movement, a circumferentially extending slot 30 is provided at the extreme end of the rear wall section 24. Projecting into slot 30 from above are the associated, radially projecting rear root-end portions 26 of the nozzle vane ring segments 27. The right-hand supporting shoulder 31 of the circumferential slot 30 is formed with, preferably circumferentially equally spaced, recesses 32 projecting into which are axially bent ends 33 of the radially projecting root-end portions 26. In the arrangement of FIG. 2, as was the case with the embodiment of FIG. 1, seals 20 and 22 can be inserted between the otherwise strictly metallic mating faces. The sealing rings used for the purpose can be made of teflon or similar material.

The embodiment of FIG. 2 also enables the functions of resilient sealing and central location, respectively, to be truly separated one from the other. In the interest of reducing weight, the forward resilient wall section 29 can then be made relatively slender.

In the event that such seals or sealing rings should be rejected in favour of strictly metallic mating and cooperating sealing faces, wear inhibiting coatings can be deposited on these mating surfaces by thermal spraying or by an electroplating process.

As a thermal spraying process, use can be made of the plasma or the flame shock spraying method. In the case of plasma spraying, chromium carbide ($Cr_3C_2$) or other embedding powder is applied, about 0.3 mm thick, on the friction or mating faces involved. In the case of flame spraying, tungsten carbide/cobalt coatings can be deposited on the friction or mating faces for a coating thickness of 0.07 to 0.1 mm. The maximum service temperature in the latter case would be about 550° C., and in the former ($Cr_3C_2$) it would be near 800° C.

Wear inhibiting coatings deposited on the friction or mating faces by electroplating could be, e.g., nickel, chromium or silver. With reference to wear inhibiting coatings, optimum sealing effect could essentially be achieved only when variations in manufacturing tolerances are relatively small. Otherwise, sealing by sealing rings would be the preferred practice.

The last-mentioned principles apply also to the deposition of abraidable coatings, using the plasma spraying process, on the mating faces to be sealed. Abraidable coatings preferably consist of essentially three constituents, i.e., Ni-Cr-iron, borium nitride, and aluminium (coating thickness=about 1 mm for thermal applications of about 800° C. max). This assumes, with reference again to FIG. 1, that the mating faces b and f on the vane carrier 11 can be given very accurate dimensions. The manufacturing tolerances will normally be more liberal on the individual nozzle vane ring segments. It is anticipated that in operation, the mating faces b and f, extending as they do in a direction coaxial with the centerline of the turbomachine, will work into the abraidable coatings on the faces a and c to various depths from one segment to the next and so compensate for variations in tolerances.

Apart from simplified assembly and disassembly operations, the present invention provides a set of paired components, i.e., nozzle vane cascade/ inner nozzle vane carrier (air casing component), that remains free of distortion in the presence of relatively abrupt temperature variations. Such variations are caused by fluctuating loads, and also by temperature differences between the outer turbine casing, the nozzle vane segments, and the inner air casing component (inner vane carrier) that are inherent in the design.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. A turbine nozzle vane suspension arrangement for a gas turbine engine, wherein the nozzle vanes are suspended by their outer shroud segments from the outer turbine casing and are suspended by their inner vane ring segments from an annular vane carrier, the vane carrier having axially spaced-apart radially extending wall sections cooperating with root-ends projecting radially from the vane ring segments, characterized by the vane ring segments and their root-ends and the vane carrier and its wall sections defining between them an annular channel, the forward wall section, viewed in the direction of main gas flow through the engine, of the vane carrier being formed as one piece with the remainder of the vane carrier and being axially resilient, the forward wall section, due to its inherent resilience, bearing resiliently against the forward vane root-ends, thereby providing a seal for the annular channel, and means for introducing cooling air into the annular channel.

2. A turbine nozzle vane suspension arrangement as defined in claim 1 wherein one of the forward and rearward wall sections of the vane carrier and its respective root-ends of the vane ring segments are coupled together by a joint which provides centrally and circumferentially locating suspension and limited radial and axial movement.

3. A turbine nozzle vane suspension arrangement as defined in claim 1 wherein the forward wall section of the vane carrier bears against the rearward surface of the forward vane root-ends and is flexible axially rearwardly to permit the vane ring segments to be mounted on the vane carrier.

4. A turbine nozzle vane suspension arrangement as defined in claim 1 including another seal between the rearward wall section of the vane carrier and the rear root-ends of the vane ring segments.

5. A turbine nozzle vane suspension arrangement as defined in claim 1 wherein the joint between the forward vane carrier is produced solely by the resilient force with which the forward wall section presses against the root-ends.

6. A turbine nozzle vane suspension arrangement as defined in claim 1 including a circumferential slot in the radial end face of the rearward wall section of the vane carrier, the rearward vane root-ends being accommodated within the slot, one side of the slot being formed with circumferentially equally spaced recesses extending to the free edge of that side, and the rearward vane root-ends formed with axially directed ends accommodated within the recesses.

7. A turbine nozzle vane suspension arrangement as defined in claim 1 including wear-inhibiting coatings on the contacting surfaces of the wall sections and root-ends.

8. A turbine nozzle vane suspension arrangement as defined in claim 7 wherein the wear-inhibiting coatings are chromium carbide, or other embedding powders, applied by a plasma thermal spraying process.

9. A turbine nozzle vane suspension arrangement as defined in claim 7 wherein the wear-inhibiting coatings are tungsten carbide/cobalt applied by a flame shock thermal spraying process.

10. A turbine nozzle vane suspension arrangement as defined in claim 7 wherein the wear-inhibiting coatings are nickel, chromium, or silver applied by an electroplating process.

11. A turbine nozzle vane suspension arrangement as defined in claim 1 including abraidable coatings on some of the contacting surfaces of the wall sections and root-ends, the abraidable coatings being Ni-Cr-iron, boron nitride, and aluminium applied by a plasma spraying process.

12. A turbine nozzle vane suspension arrangement for a gas turbine engine, wherein the nozzle vanes are suspended by their outer shroud segments from the outer turbine casing and are suspended by their inner vane ring segments from an annular vane carrier, the vane carrier having axially spaced-apart radially extending wall sections cooperating with root-ends projecting radially from the vane ring segments, characterized by the vane ring segments and their root-ends and the vane carrier and its wall sections defining between them an annular channel, the forward wall section, viewed in the direction of main gas flow through the engine, of the vane carrier being axially resilient and bearing resiliently against the forward vane root-ends, thereby providing a seal for the annular channel, and means for introducing cooling air into the annular channel and for maintaining the fluid pressure in the annular channel higher than the pressure on the side of the resilient wall section external to the duct.

13. A turbine nozzle vane suspension arrangement for a gas turbine engine, wherein the nozzle vanes are suspended by their outer shroud segments from the outer turbine casing and are suspended by their inner vane ring segments from an annular vane carrier, the vane carrier having axially spaced-apart radially extending wall sections cooperating with root-ends projecting radially from the vane ring segments, characterized by the vane ring segments and their root-ends and the vane carrier and its wall sections defining between them an annular channel, the forward wall section, viewed in the direction of main gas flow through the engine, of the vane carrier being axially resilient and bearing resiliently against the forward vane root-ends, thereby providing a seal for the annular channel, means for introducing cooling air into the annular channel, and a sealing ring between the forward wall section of the vane carrier and the forward root-end, the sealing ring being partially embedded in the forward wall section and being coaxial with the turbine centerline.

* * * * *